US008529202B2

(12) United States Patent
Zhang

(10) Patent No.: US 8,529,202 B2
(45) Date of Patent: Sep. 10, 2013

(54) SYSTEM AND METHOD FOR TURBINE COMPARTMENT VENTILATION

(75) Inventor: Jianmin Zhang, Greer, SC (US)

(73) Assignee: General Electric Company, Schenectady, NY (US)

( * ) Notice: Subject to any disclaimer, the term of this patent is extended or adjusted under 35 U.S.C. 154(b) by 567 days.

(21) Appl. No.: 12/902,257

(22) Filed: Oct. 12, 2010

(65) Prior Publication Data
US 2012/0087783 A1 Apr. 12, 2012

(51) Int. Cl.
*F01D 25/08* (2006.01)

(52) U.S. Cl.
USPC .......................................................... 415/177

(58) Field of Classification Search
USPC ................. 415/175, 176, 177, 178, 179, 180, 415/232
See application file for complete search history.

(56) References Cited

U.S. PATENT DOCUMENTS

| 6,357,221 | B1 | 3/2002 | Schroeder et al. |
| 6,422,807 | B1 * | 7/2002 | Leach et al. ...................... 415/1 |
| 6,470,689 | B2 | 10/2002 | Schroeder et al. |
| 6,477,843 | B2 | 11/2002 | Schroeder et al. |

* cited by examiner

*Primary Examiner* — Richard Edgar
(74) *Attorney, Agent, or Firm* — Cantor Colburn LLP

(57) ABSTRACT

According to an aspect of the invention, a method for ventilating a turbine compartment is provided, the method comprising directing an air flow from an air intake to a first air conduit, transferring a first heat between the air flow and a first fluid within a heat exchange apparatus and pumping the first fluid through a fluid circuit in fluid communication with the heat exchange apparatus, wherein a portion of the fluid circuit is located underground. The method further includes transferring a second heat between the first fluid and a surrounding ground and directing a conditioned air flow from the heat exchange apparatus to a turbine compartment via a second air conduit.

20 Claims, 3 Drawing Sheets

SYSTEM AND METHOD FOR TURBINE COMPARTMENT VENTILATION

BACKGROUND OF THE INVENTION

The subject matter disclosed herein relates to power generation plants. More particularly, the subject matter relates to ventilating a turbine compartment of a power generation plant.

In power generation systems, a turbine compartment needs proper ventilation for several reasons. Examples of turbine compartment ventilation considerations include maintaining turbine clearances within reasonable ranges for better operational efficiency and keeping volatile organic compounds (VOCs) from accumulating inside of the turbine compartment. Ventilation capacity for a gas turbine compartment is determined based on several factors, including turbine casing surface heat dissipation rates, leakage from gas turbine casing flanges, local ambient conditions, ventilation arrangement (such as pressurized or non-pressurized turbine compartment) and safety considerations. These factors may make ventilation designs challenging for sites that experience extreme ambient air temperatures above 120 degrees Fahrenheit. In such cases, temperature control may be achieved by increased ventilation air flow. However, increased ventilation air flow can cause problems due to non-uniform cooling, increased parasitic electricity consumption by the ventilation fans, low sensitivity of VOC leakage detection, as well as increased leakage in compartment doors.

BRIEF DESCRIPTION OF THE INVENTION

According to one aspect of the invention, a system for turbine compartment ventilation is provided, the system including a first air conduit in fluid communication with a heat exchange apparatus, the first air conduit configured to direct an air flow at a first temperature from an air intake to the exchange apparatus, a fluid circuit in fluid communication with the heat exchange apparatus, wherein a portion of the fluid circuit is located in a heat sink, a pump located in the fluid circuit configured to flow a first fluid through the fluid circuit to transfer heat between the first fluid and the heat sink. The system further includes a second air conduit in fluid communication with the heat exchange apparatus and in fluid communication with a turbine compartment, the second air conduit configured to direct the air flow at a second temperature from the heat exchange apparatus to the turbine compartment.

According to another aspect of the invention, a method for ventilating a turbine compartment is provided, the method comprising directing an air flow from an air intake to a first air conduit, transferring a first heat between the air flow and a first fluid within a heat exchange apparatus and pumping the first fluid through a fluid circuit in fluid communication with the heat exchange apparatus, wherein a portion of the fluid circuit is located underground. The method further includes transferring a second heat between the first fluid and a surrounding ground and directing a conditioned air flow from the heat exchange apparatus to a turbine compartment via a second air conduit.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
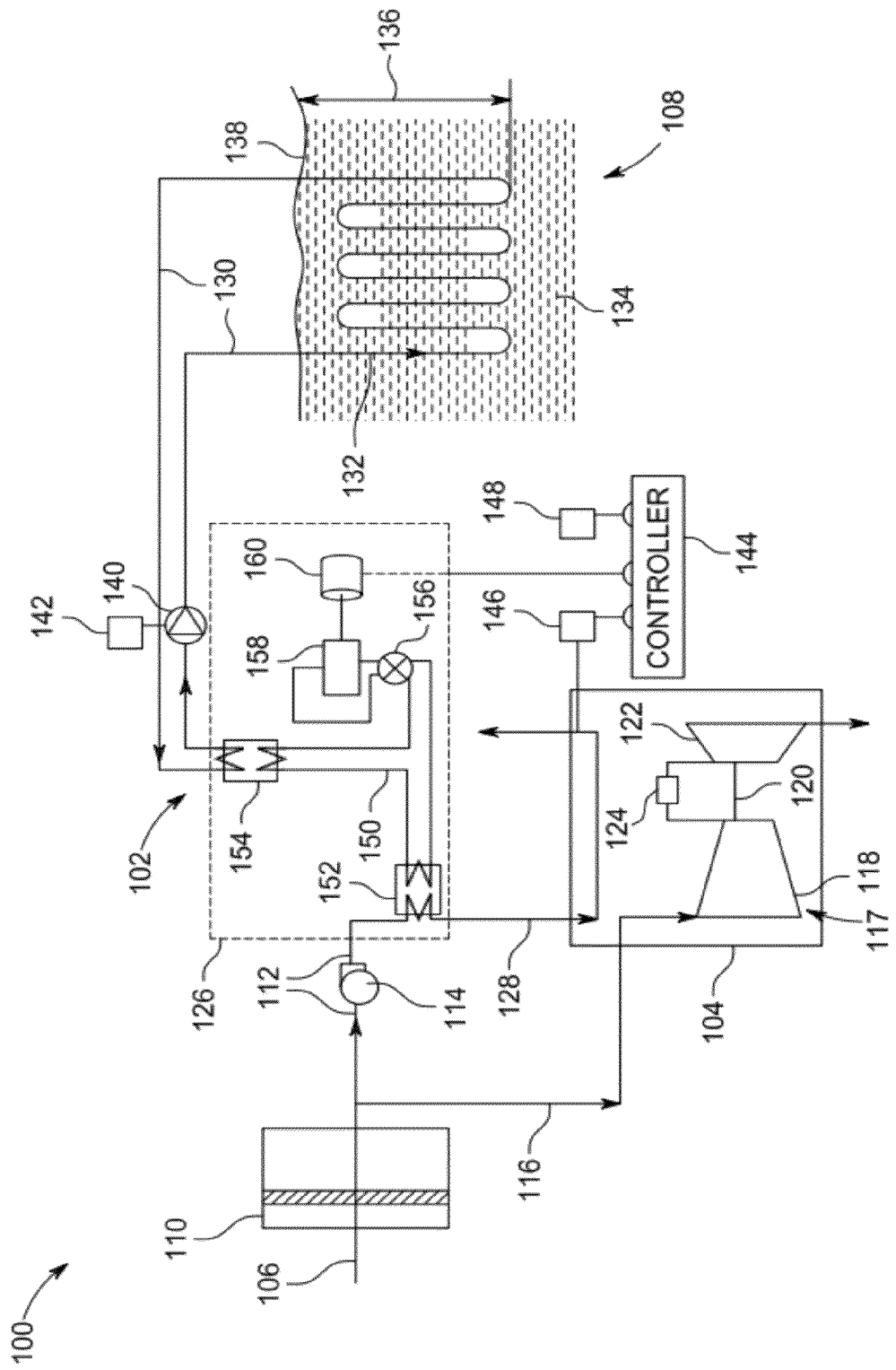
FIG. 1 is a schematic diagram of an embodiment of a power generation system that includes a ventilation system.

FIG. 1 shows a schematic diagram of an embodiment of a power generation system 100 used to generate an electrical and/or mechanical power output. The power generation system 100 includes a ventilation system 102 and turbine compartment 104. The ventilation system 102 is configured to condition an air intake 106 to turbine compartment 104. As depicted, the ventilation system 102 includes and utilizes a geothermal system 108 to condition the air. The ambient air intake 106 includes a filter 110 to remove particles and impurities from the external air. The ambient air flow is directed through a first conduit 112, which includes a first vent fan 114 providing a force to cause the air flow through the first conduit 112. In an embodiment, the ambient air intake 106 directs a portion of air flow to the first conduit 112 and a second portion to a turbine air supply 116. The turbine air supply 116 directs an air flow used by the turbine engine 117. The turbine engine 117 includes a compressor 118, a shaft 120, a turbine 122 and a combustor 124. In an embodiment, the turbine engine 117 may include a plurality of compressors 118, combustors 124, turbines 122 and shafts 120. As depicted, the compressor 118 and turbine 122 are coupled by the shaft 120.

In an aspect, the combustor 124 uses liquid and/or gas fuel, such as natural gas or a hydrogen rich synthetic gas, to run the turbine engine. For example, fuel nozzles located in the combustor 124 are in fluid communication with a fuel supply and pressurized air provided by the compressor 118. The compressor 118 receives an air supply 116, wherein the compressor blades or vanes turn to compress the air that is then directed to the fuel nozzles. The fuel nozzles create an air-fuel mix, and discharge the air-fuel mix into the combustor 124, thereby causing a combustion that creates a hot pressurized gas. The combustor 124 directs the hot pressurized gas into a turbine nozzle (or "stage one nozzle"), causing turbine 122 rotation as the hot gas flows across vanes in the nozzle. The rotation of turbine 122 causes the shaft 120 to rotate, thereby compressing the air as it flows into the compressor 118. Rotation of the shaft 102 further provides a rotational mechanical output, which may be used to generate electricity.

Still referring to FIG. 1, the first air conduit 112 provides ambient air flow to a heat exchange apparatus 126, wherein the air flow is conditioned and is then directed through a second air conduit 128 to turbine compartment 104. The ventilation system 102 utilizes geothermal temperature cycles of a geothermal system 108 to condition or treat the air flow into the compartment 104. The geothermal system 108 comprises a fluid circuit 130 wherein a portion of the circuit is located underground, as indicated by numeral 132. A surrounding ground area 134 acts as a heat sink and geothermal source to transfer heat to and/or from the fluid flowing through underground circuit 132, depending on the desired turbine compartment temperature and the ambient air temperature. In embodiments, the heat sink is a suitable source, component or assembly that transfers heat generated within a material to a fluid medium, such as air or a liquid. Exemplary heat sinks include, but are not limited to, a surrounding ground, a body of water, a combination of ground and water and a fin or pin-based structure located inside or outside of a power plant building. As will be discussed in detail below with respect to FIG. 2, temperature cycles at a depth 136 of the underground circuit 132 enable heat transfer between the surrounding ground 134 and the flowing fluid, thereby providing a transfer of heat between the flowing fluid in the circuit 130 and ambient air inside first air conduit 112 via heat exchange apparatus 126. In addition, the ambient air and surrounding ground 134 may have substantially inverse temperature cycles or opposite phases over a selected time period. The depth 136 of the circuit 132 may depend on several factors, including but not limited to, environmental conditions, system properties, desired compartment temperatures, costs or any combination thereof. For example, in an embodiment, the depth 136 of circuit 132 may be less than about 50 feet below the surface 338. In another embodiment, the depth 136 is less than about 25 feet below the surface 338. In yet another embodiment, the depth 136 is less than about 10 feet below the surface 338.

As depicted, the fluid circuit 130 includes a pump 140 to circulate the fluid through the ground 134 and heat exchange apparatus 126. A controller 142 may be coupled to the pump 140 to monitor and control various parameters, such as the rate at which the fluid is pumped. In an embodiment, the fluid is any suitable fluid to flow through circuit conduits and transfer a selected amount of heat, such as water or a water and antifreeze mixture. The pump 140 may be any suitable durable pump, such as an industrial electric fluid pump. The controller 142 may also include at least one sensor to measure flow rate, temperature or other properties of the fluid. In one embodiment, the controller 142 is a remote controller that communicates with one or more other controllers, such as controller 144, with a wired or wireless connection, such as Ethernet or an 802.11 wireless protocol. The controllers 142 and 144 may be computer-based units that include a processor, a memory storage device (such as a solid-state memory) and one or more programs in the storage device that are accessible to the processor for executing instructions contained in such programs. In the depicted embodiment, the controller 144 is coupled to heat exchange apparatus 126, compartment temperature sensor 146 and ambient temperature sensor 148, wherein the sensors provide information used by the controller 144 to control a temperature of the air flow into turbine compartment 104. Accordingly, the controllers 142 and 144 utilize programs and hardware to monitor parameters of the ambient and compartment air temperature and provide instructions to perform selected functions of the ventilation system 102 to heat and/or cool the ambient air as it flows through the heat exchange apparatus 126 into the turbine compartment 104.

With continued reference to FIG. 1, the exemplary embodiment of ventilation system 102 includes a heat exchange apparatus 126 that comprises an intermediate circuit 150, coil 152, heat exchanger 154, valve 156, compressor 158 and compressor motor 160. The intermediate circuit 150 directs a refrigerant fluid in a selected direction depending on the selected temperature for compartment air and the ambient air temperature. The refrigerant fluid may be any suitable fluid, such as ammonia, carbon dioxide and non-halogenated hydrocarbon. It should be noted that the states of the fluid flowing through intermediate circuit 150 and fluid circuit 130 may vary depending on a variety of factors, including fluid properties, environmental conditions, system conditions or a combination thereof.

Exemplary heating and cooling modes of ventilation system 102 are now described in detail. In a cooling mode, the ambient air at temperature T1 flows through first air conduit 112 to coil 152. Further, in the cooling mode, the refrigerant fluid flows in a counterclockwise direction from the heat exchanger 154 to coil 152 to compressor 158 to back to heat exchanger 154. The coil 152 receives the refrigerant flow via intermediate conduit 150 from heat exchanger 154, wherein the refrigerant has been cooled by the fluid flowing through fluid circuit 130. Accordingly, the fluid in circuit 130 is cooled as it is pumped through underground circuit 132, where the ground 134 is at temperature T2, which is lower than T1. Thus, the cooled fluid flows from the underground circuit 132 to cool the refrigerant flowing through heat exchanger 154. The refrigerant received by the heat exchanger 154 via intermediate circuit 150 is a vapor compressed by compressor 158 and routed to the heat exchanger 154 by the valve 156, wherein the heat exchanger 154 condenses the refrigerant and transfers heat to the fluid 130, thereby changing the refrigerant to a liquid. The intermediate circuit 150 directs the cooled liquid refrigerant through an expansion device such as an orifice (not shown) and then through the coil 152 to cool the ambient air, receiving the heat from the air. In another embodiment, an expansion device is integrated in coil 152. As the refrigerant is heated, a portion of it turns to gas within coil 152 and the refrigerant is then directed to the compressor 158 via the valve 156. Therefore, in the embodiment, the air directed from the coil 152 by second air conduit 128 to the turbine compartment 104 is at a third temperature T3, which is less than T1 and within a selected range for the compartment.

In a heating mode, the ambient air at temperature T1 flows through first air conduit 112 to coil 152. Further, in the heating mode, the refrigerant fluid flows in a clockwise direction from compressor 158 to the coil 152 to an expansion device to heat exchanger 154 back to compressor 158. The coil 152 receives a compressed vapor refrigerant flow via intermediate conduit 150 from compressor 158. The refrigerant received by the compressor 158 is heated by the fluid flowing through the underground portion 132 of fluid circuit 130, where the ground 134 is at temperature T2 which is greater than T1. Thus, the heated fluid flows from the underground circuit 132 to heat the refrigerant flowing through heat exchanger 154. The refrigerant is condensed in the coil 152 while releasing heat to the ambient air also flowing through the coil 152. The refrigerant then flows to the heat exchanger 154 from the coil 152, via intermediate circuit 150 and an expansion device. The heat exchanger 154 then heats the refrigerant in intermediate circuit 150 by transferring heat from the fluid circuit 130 to create a vapor that is directed to the compressor 158 by valve 156. The compressed vapor from compressor 158 is a heated refrigerant that transfers heat to the ambient air within coil 152. Therefore, in the embodiment, the air directed from the coil 152 by second air conduit 128 to turbine compartment 104 is at temperature T3, which is greater than T1 and within a selected range for the compartment. It should be noted that for both of the heating and cooling embodiments discussed above, the ambient air flows through conduits 112 and 128 to be conditioned by heat exchange apparatus 126, wherein the heat exchange apparatus 126 transfers a heat, via circuit 130, between the ground 134 and the ambient air, using any suitable method and equipment, such as the illustrated examples.

With continued reference to FIG. 1, in an embodiment, the coil 152 and heat exchanger 154 are each devices in fluid and thermal communication with two fluid supplies, wherein the devices enable a heat transfer between the fluid supplies. The valve 156 may be any suitable valve configured to direct refrigerant flow in a selected direction, depending on the mode of the ventilation system 102. In one example, the valve 156 is a four way valve that enables the ventilation system 102 to change a fluid flow direction in circuit 150 to heat or cool the ambient air supply. The compressor 158 and compressor motor 160 are suitable devices that compress gas to a compressed vapor. The depicted power generation systems 100 and ventilation systems 102 may be used to control a temperature of air directed to a compartment housing a plurality of turbines as well as an air temperature of a plurality of turbine compartments within a power plant. Although the discussion primarily focuses on gas turbines, the concepts discussed are not limited to gas turbines.

The disclosed ventilation system 102 provides an energy efficient solution for conditioning ambient vent air, thereby reducing or eliminating a need for substantial increase of ventilation air flow. The characteristics of underground temperature cycles in an opposite phase or inverse to ambient temperature cycles enable the ventilation system to provide a viable and cost saving solution, especially for extremely hot or cold environments, such as the extreme heat of ambient air encountered by power generation systems in the Middle East. Thus, by efficiently conditioning the intake air temperature to the compartment 104, an embodiment of the ventilation system 102 provides reduced parasitic power consumption, reduced wear, improved reliability and improved operating conditions for the turbine 117, related instrumentation, turbine casings and other parts. In embodiments, the heat exchange apparatus 126 performs the desired air conditioning functions using less or more components, depending on application needs, cost concerns and other factors. For example, as shown below in FIG. 3, the heat exchange apparatus 126 may be simplified for a basic ambient air cooling or control without a vapor compression cycle. In other embodiments, additional and/or different components may be utilized to perform the functions described herein with respect to the heat exchange apparatus 126. As discussed herein, conditioning the air may be considered a process that adjusts at least one physical property of the air flow, including such non-limiting examples as wet-bulb temperature, dry-bulb temperature, relative humidity or density.

Figure 2:
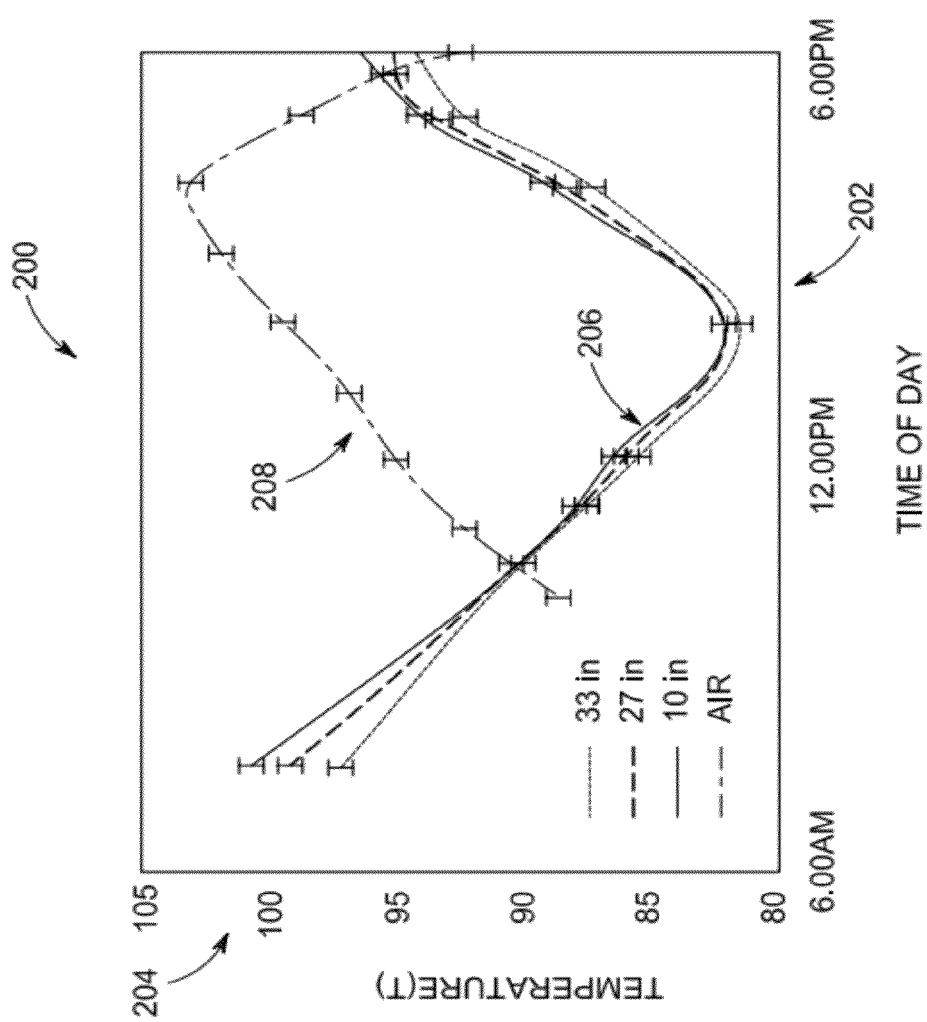
FIG. 2 is a graph of exemplary plots of ambient air temperature and ground temperature over a time period.

FIG. 2 is a graph 200 of exemplary plots of ambient air temperature and ground temperature over a time period. The graph 200 includes a time period from 6:00 AM to 6:00 PM shown on the x-axis, indicated by numeral 202. A temperature in Fahrenheit is shown on y-axis, indicated by numeral 204. Temperature data plots 206 indicate measurements taken underground at selected depths over a time period. The illustrated plots 206 are taken at 10, 27 and 33 inches below the surface. Temperature data plots 208 indicate temperature measurements of ambient air taken over the same time period. As shown, the temperature cycles of the ambient air 208 and underground 206 are substantially the inverse of one another or of an opposite phase over a selected time period, such as the time period shown between 8:00 AM and 6:00 PM. The ventilation system discussed herein flows fluids through conduits and circuits to utilize the inverse temperature cycles to cool or heat a turbine compartment air intake.

For example, the underground graph shows that the ground temperature is about 81 degrees F., while the ambient air is about 100 degrees F. at about 1:30 PM. Further, the selected or desired temperature range for the turbine compartment air is between 87 and 93 degrees F. Thus, the fluid circuit 130 (FIG. 1) cools fluid using the cool ground temperature, which is then used by the heat exchanger 126 to cool the ambient air flow, thereby providing a cooled air flow 128 of about 90 degrees F. to the compartment 104. The cycles of ambient air and ground temperatures may also be the inverse of each other for an application to heat ambient air, wherein a peak or high ground temperature occurs substantially near the same time as a low ambient air temperature. In such a case, the geothermal source of the ground provides heat, via the fluid circuit 130, that is transferred the ambient air intake via the heat exchange apparatus by the methods discussed herein.

Figure 3:
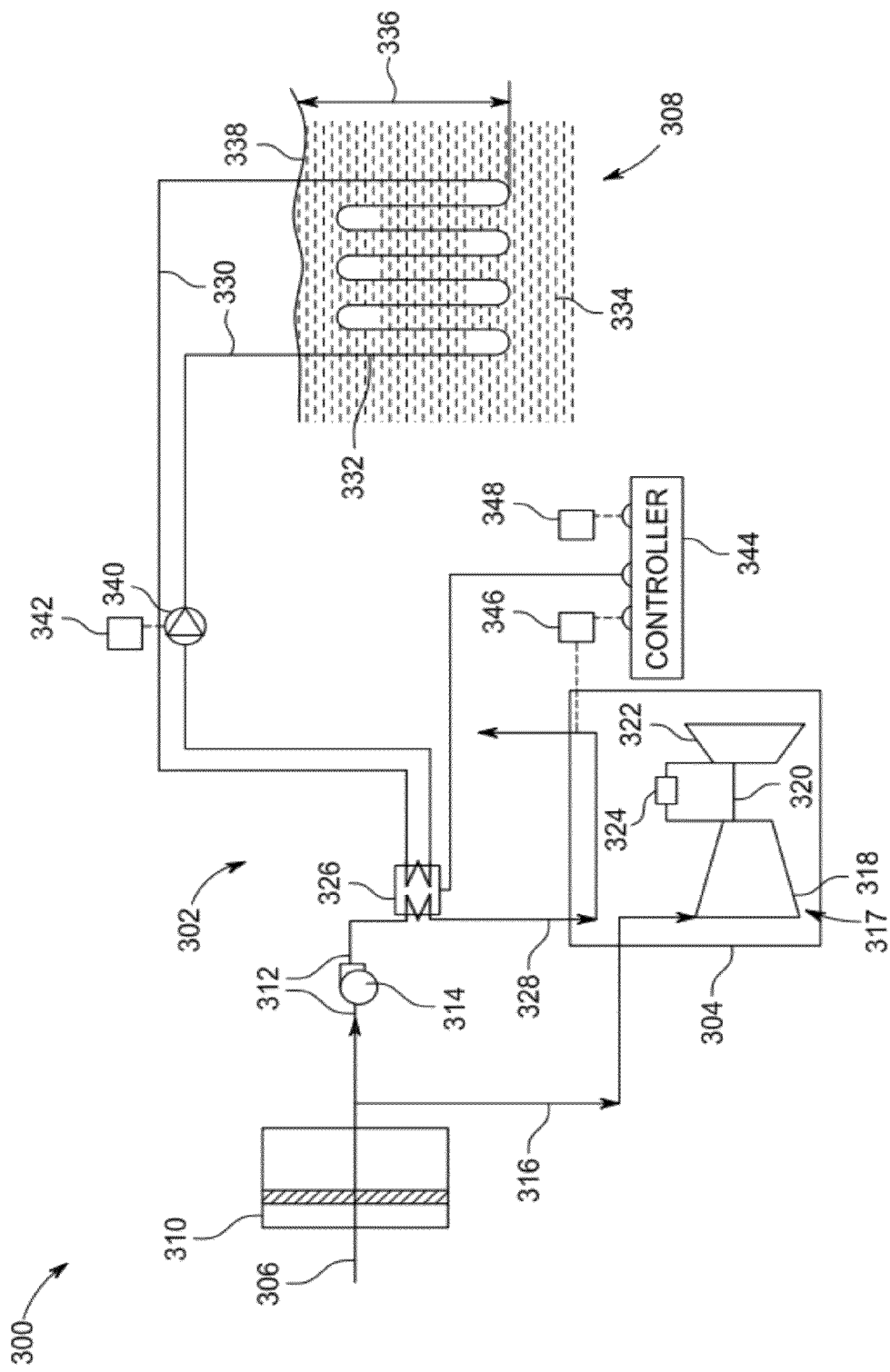
FIG. 3 is a schematic diagram of another embodiment of a power generation system that includes a ventilation system.

FIG. 3 is a schematic diagram of another exemplary embodiment of a power generation system 300 that includes a ventilation system 302. The illustrated system is substantially similar method of operation to the exemplary system of FIG. 1, with the system depicted in FIG. 3 including a simplified embodiment of heat exchange apparatus 326. The ventilation system 302 is configured to condition an air intake 306 of a turbine compartment 304. The ventilation system 302 includes geothermal system 308 to assist in conditioning the air. The ambient air intake 306 includes a filter 310 to remove particles and impurities from the external air. The ambient air flow is directed through a first conduit 312, which includes a first vent fan 314 providing a force to cause the air flow through the first conduit 312. In an embodiment, the ambient air intake 306 directs a portion of air flow to the first conduit 312 and a second portion to a turbine air supply 316. The turbine air supply 316 directs an air flow used by the turbine engine 317. The turbine engine 317 includes a compressor 318, a shaft 320, a turbine 322 and a combustor 324.

The first air conduit 312 provides ambient air flow to a heat exchange apparatus 326, wherein the air flow is conditioned and is then directed through a second air conduit 328 to turbine compartment 304. The ventilation system 302 utilizes geothermal temperature cycles of a geothermal system 308 to condition or treat the air flow into the compartment 304, wherein the geothermal cycles are substantially the inverse of the ambient air cycles. The geothermal system 308 comprises a fluid circuit 330 wherein a portion 332 of the circuit is located underground. A surrounding ground area 334 acts as a geothermal source to transfer heat to and/or from the fluid flowing through underground circuit 332, wherein the circuit is located at a selected depth 336, depending on application requirements. As depicted, the fluid circuit 330 includes a pump 340 to circulate the fluid through the ground 334 and heat exchange apparatus 326. A controller 342 may be coupled to the pump 340 to control various parameters of the circuit 330, such as pumping rate. In one embodiment, the controller 342 is a remote controller that communicates with one or more other controllers, such as controller 344. As depicted, the controller 344 is coupled to heat exchange apparatus 326, compartment temperature sensor 346 and ambient temperature sensor 348, wherein the sensors provide information to control a temperature of the air flow into turbine compartment 304.

In the exemplary embodiment of FIG. 3, heat exchange apparatus 326 is a device in fluid communication with the ambient air intake via first air conduit 312 and the fluid within fluid circuit 330. In an exemplary heating mode, the pump 340 circulates the fluid in fluid circuit 330 through the underground portion 332, where the ground 334 temperature is greater than the ambient air temperature, thereby heating the fluid as it flows through the ground 334. The heat exchange apparatus 326 enables heat to transfer from the heated fluid to the ambient air. The heated ambient air is then directed to the compartment 304 by conduit 328. In an exemplary cooling mode, the pump 340 circulates the fluid in fluid circuit 330 through the underground portion 332, where the ground 334 temperature is less than the ambient air temperature, thereby cooling the fluid as it flows through the ground 334. The heat exchange apparatus 326 enables heat to transfer from the ambient air to the cooled fluid. The cooled air is then directed to the compartment 304 by conduit 328. Thus, by efficiently conditioning the intake air temperature to the compartment 304, an embodiment of the ventilation system 302 provides reduced parasitic power consumption, reduced wear, improved reliability and improved operating conditions for the turbine 317, related instrumentation, turbine casings and other parts.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for turbine compartment ventilation, the system comprising:
    a first air conduit in fluid communication with a heat exchange apparatus, the first air conduit configured to direct an air flow at a first temperature from an air intake to the heat exchange apparatus;
    a fluid circuit in fluid communication with the heat exchange apparatus, wherein a portion of the fluid circuit is located underground;
    a pump located in the fluid circuit configured to flow a first fluid through the fluid circuit to transfer a first heat between the first fluid and a heat sink; and
    a second air conduit in fluid communication with the heat exchange apparatus and in fluid communication with a turbine compartment, the second air conduit configured to direct the air flow at a second temperature from the heat exchange apparatus to the turbine compartment.

2. The system of claim 1, wherein the first fluid transfers the first heat from the first fluid to the surrounding ground and wherein the first temperature is greater than the second temperature.

3. The system of claim 1, wherein the heat sink is a geothermal source with a temperature cycle that is substantially an inverse of an ambient air temperature cycle over a time period.

4. The system of claim 1, wherein the heat exchange apparatus comprises an intermediate circuit in fluid communication with a heat exchanger and a coil, the coil being in fluid communication with the first and second air conduits, wherein the heat exchanger transfers a second heat between a second fluid in the intermediate circuit and the first fluid and the coil transfers heat between the second fluid and the air flow.

5. The system of claim 4, comprising a compressor in the intermediate circuit to change a state of the second fluid.

6. The system of claim 1, comprising a controller coupled to the pump and coupled to a temperature sensor positioned to determine a third temperature of the turbine compartment and to maintain the third temperature within a selected temperature range.

7. The system of claim 1, wherein the heat sink comprises a surrounding ground.

8. The system of claim 7, wherein the first fluid absorbs the first heat from the surrounding ground and wherein the first temperature is less than the second temperature.

9. A power generation system, comprising:
    a turbine compartment containing a gas turbine;
    an air conduit in fluid communication with the turbine compartment, the air conduit configured to receive an air flow from the ambient environment, direct the air flow through a coil and direct a conditioned air flow from the coil to the turbine compartment;
    a fluid circuit in fluid communication with a heat exchanger, wherein a portion of the fluid circuit is located in a heat sink and a first fluid flows through the fluid circuit to transfer a first heat between the first fluid and the heat sink; and
    an intermediate circuit in fluid communication with the coil and heat exchanger, wherein a second fluid is configured to flow through the intermediate circuit to transfer a second heat between the received ambient air flow and the first fluid.

10. The system of claim 9, wherein the heat sink comprises a surrounding ground.

11. The system of claim 10, wherein the air flow received by the air conduit has a first temperature and the conditioned air flow has a second temperature, the first temperature being greater than the second temperature.

12. The system of claim 11, wherein the second fluid transfers the second heat received from the air flow in the coil to the first fluid in the heat exchanger via the intermediate circuit, the first fluid transferring the second heat to the surrounding ground via the fluid circuit, thereby conditioning the air flow to the turbine compartment.

13. The system of claim 9, wherein the air flow received by the air conduit has a first temperature and the conditioned air flow has a second temperature, the first temperature being less than the second temperature.

14. The system of claim 13, wherein the first fluid receives the first heat from the surrounding ground via the fluid circuit and the second fluid transfers the heat received from the first fluid in the heat exchanger to the air flow in the coil via the intermediate circuit, thereby conditioning the air flow to the turbine compartment.

15. The system of claim 13, comprising a compressor in the intermediate circuit to change a state of the second fluid.

16. The system of claim 13, wherein an underground portion of the fluid circuit is at a depth less than about 10 feet.

17. A method for ventilating a turbine compartment, the method comprising:
    directing an air flow from an air intake to a first air conduit;
    transferring a first heat between the air flow and a first fluid within a heat exchange apparatus;
    pumping the first fluid through a fluid circuit in fluid communication with the heat exchange apparatus, wherein a portion of the fluid circuit is located underground;
    transferring a second heat between the first fluid and a surrounding ground; and
    directing a conditioned air flow from the heat exchange apparatus to a turbine compartment via a second air conduit.

18. The method of claim 17, wherein directing the air flow comprises directing the air flow at a first temperature and wherein directing the conditioned air flow comprises directing the conditioned air flow at a second temperature, wherein the first temperature is greater than the second temperature.

19. The method of claim 17, wherein directing the air flow comprises directing the air flow at a first temperature and wherein directing the conditioned air flow comprises directing the conditioned air flow at a second temperature, wherein the first temperature is less than the second temperature.

20. The method of claim 17, wherein the heat exchange apparatus comprises a heat exchanger in fluid communication with the fluid circuit and an intermediate circuit and further comprises a coil in fluid communication with the intermediate circuit and the first air conduit, wherein a second fluid is configured to flow through the intermediate circuit to transfer of the first heat between the air flow and the first fluid.

* * * * *